(No Model.)
P. F. DEAN.
SULKY.
No. 285,238. Patented Sept. 18, 1883.
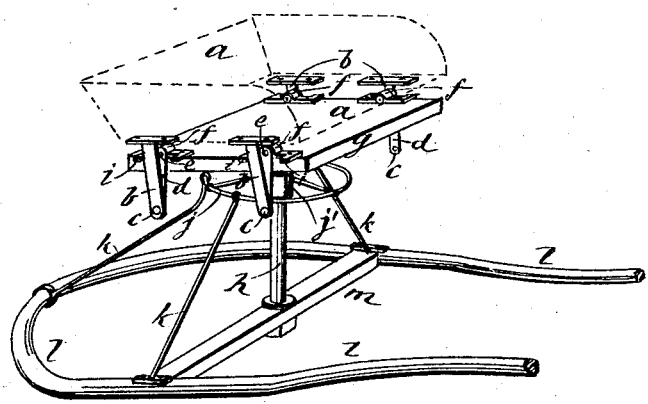
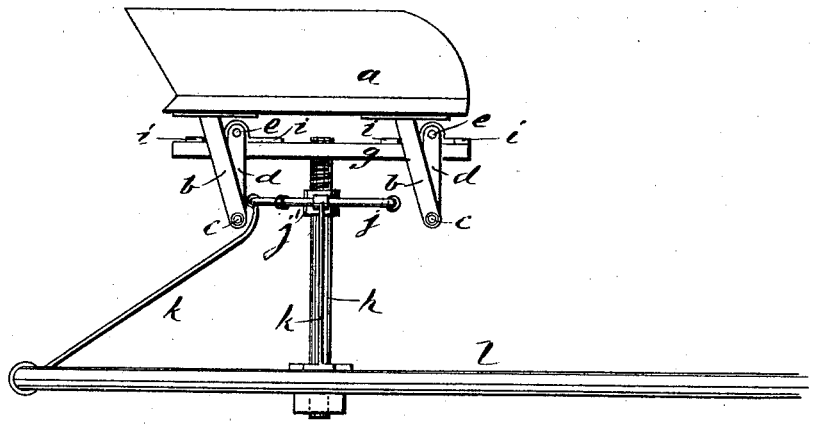
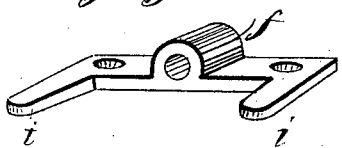
WITNESSES:
Chas. T. Howell
C. Sedgwick
INVENTOR:
P. F. Dean
BY Munn & Co.
ATTORNEYS.

UNITED STATES PATENT OFFICE.

PORCIUS F. DEAN, OF WATSONVILLE, CALIFORNIA.

SULKY.

SPECIFICATION forming part of Letters Patent No. 285,238, dated September 18, 1883.

Application filed January 25, 1883. (No model.)

*To all whom it may concern:*

Be it known that I, PORCIUS FESTUS DEAN, of Watsonville, in the county of Santa Cruz and State of California, have invented new and useful Improvements in Cart and Sulky Seats, of which the following is a full, clear, and exact description.

The object of the invention is to construct a two-wheeled vehicle which will allow the up-and-down motion of the horse and shafts without a corresponding movement of the seat-frame or body of the vehicle.

Reference is to be had to the accompanying drawings, forming part of this specification, in which similar letters of reference indicate corresponding parts in all the figures.

Figure 1 is a perspective view of a sulky having my improvements in seats. Fig. 2 is a side elevation, and Fig. 3 is a perspective view of one of the pivot-bearings on which the seat vibrates.

I propose to mount the seat *a* on swings consisting of the short upright supports *b*, projecting downward from the bottom of the seat and resting on the crank-pins *c* of crank-arms *d*, suspended from pivot-rods *e*, suitably arranged in pivot-bearings *f* on the platform *g*, to allow the seat to swing on said platform or the platform to swing under the seat. The said platform is mounted in this case on an upright support, *h*, which is capable of revolving, to allow the seat to be turned around to the sides or back of the vehicle, to facilitate mounting and dismounting.

The swing contrivance of the seat may be used with or without the revolving arrangement, and the arrangement of the connecting devices of the seat and platform may be varied at the pleasure of the constructer and to suit the circumstances of the case.

The pivot or journal bearing plates *f* may, if desired, have projections *i* extending beyond the supports *b*, for stops to limit the range of the swing of the body with reference to the seat; but the stops may be dispensed with.

The support *h* may itself be supported at the upper part by any approved ring or frame, *j*, carrying a central bearing, *j'*, and positioned by braces *k*, attached to the shafts *l* or other frame of the vehicle, the lower end of said support being pivoted in a cross-bar, *m*, or other device carried by the shafts.

It will be seen that the rider may readily so balance himself on the seat by the use of his feet and legs resting on the shafts that he can maintain supports *b* in the medium position of the range of the swing of the cart-body with reference to the seat—that is to say, between the projections *i*—so that the seat will remain at rest, so far as the swing of the cart by the rise and fall of the horse is concerned, by reason of the cart-body swinging under it, thus avoiding the unpleasant forward-and-backward swing of the body of the rider, common to all two-wheel vehicles now in use.

It will be understood that my improved seat is not limited in its application to two-wheeled vehicles, as it may be applied to vehicles in general when their design will admit of it.

I am aware that it is not new in two-wheeled vehicles to connect the body with axle-springs and also with the shaft cross-bar by double joints, which may take up jolts both from the wheels and from the up-and-down movement of the horse, or to support the seat upon a vertical bar which straddles the axle and rests upon a swing beneath and swinging by links from the axle; but What I do claim as new and of my invention is—

1. The combination, with the shafts of a two-wheeled vehicle, of a body supported thereon, a seat having the downward projections *b*, the arms *d*, pivoted at *c* to said supports and having the crank-pins *e*, and the platform *g*, having the bearings *f f*, whereby the up-and-down movement of the shafts will not be communicated to the body.

2. The bearing-plate *f*, having two end projections, *i i*, and holes for attachment to the platform, whereby it may serve both as a stop and a bearing, as described.

3. The combination of projecting stops *i* with the supports *b*, cranks *d e*, seat *a*, and the platform *g*, of a vehicle, substantially as described.

4. In a two-wheeled vehicle, the ring *j*, supported from the shafts by braces *k*, and connected by radial arms with a hub or central bearing, *j'*, to support an upright, *h*, as shown and described 5. The combination, with a vehicle, of a seat, *a*, capable of swinging forward and backward with relation to the body, and also capable of revolving thereon, substantially as described.

PORCIUS FESTUS DEAN.

Witnesses:
JAMES LA FAYETTE HALSTED,
ASHBEL SMITH KITTREDGE.